(12) United States Patent
Lewis

(10) Patent No.: US 7,284,277 B2
(45) Date of Patent: Oct. 16, 2007

(54) SECURED PRINTING

(75) Inventor: Johnny MacArthur Lewis, Meridian, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 795 days.

(21) Appl. No.: 10/195,721

(22) Filed: Jul. 15, 2002

(65) Prior Publication Data

US 2004/0010704 A1    Jan. 15, 2004

(51) Int. Cl.
H04L 9/00    (2006.01)

(52) U.S. Cl. ............ 726/29; 726/2; 713/189; 358/1.15

(58) Field of Classification Search ........ 713/176, 713/200, 168, 182, 189, 170; 705/64; 358/1.15; 726/2, 29; 729/2, 29
See application file for complete search history.

(56) References Cited

U.S. PATENT DOCUMENTS

| | | | |
|---|---|---|---|
| 5,596,718 A | | 1/1997 | Boebert et al. |
| 5,610,688 A | * | 3/1997 | Inamoto et al. ............ 399/366 |
| 5,633,932 A | * | 5/1997 | Davis et al. ............... 713/176 |
| 6,111,953 A | * | 8/2000 | Walker et al. ............... 380/51 |
| 6,163,383 A | | 12/2000 | Ota et al. |
| 6,181,436 B1 | | 1/2001 | Kurachi |
| 6,378,070 B1 | | 4/2002 | Chan et al. |
| 6,384,926 B2 | | 5/2002 | Mochizuki |
| 6,650,794 B1 | | 11/2003 | Aoki |
| 6,732,278 B2 | * | 5/2004 | Baird et al. ................... 726/7 |
| 6,738,903 B1 | * | 5/2004 | Haines ........................ 713/168 |
| 6,862,583 B1 | * | 3/2005 | Mazzagatte et al. .......... 705/64 |
| 7,088,461 B2 | * | 8/2006 | Miyano ...................... 358/1.14 |
| 2002/0035546 A1 | | 3/2002 | Aoki |
| 2002/0062453 A1 | | 5/2002 | Koga |
| 2002/0063889 A1 | * | 5/2002 | Takemoto et al. ......... 358/1.15 |
| 2002/0122201 A1 | | 9/2002 | Haraguchi et al. |
| 2002/0145748 A1 | * | 10/2002 | Nonoyama et al. ........ 358/1.14 |
| 2003/0002066 A1 | * | 1/2003 | Miyano ...................... 358/1.14 |
| 2003/0009672 A1 | * | 1/2003 | Goodman ................... 713/176 |
| 2003/0014640 A1 | * | 1/2003 | Loyd .......................... 713/182 |
| 2003/0101342 A1 | * | 5/2003 | Hansen ....................... 713/167 |
| 2003/0105643 A1 | * | 6/2003 | Chen et al. ..................... 705/1 |
| 2003/0151762 A1 | * | 8/2003 | Cherry et al. .............. 358/1.14 |
| 2003/0187951 A1 | | 10/2003 | Shen |

* cited by examiner

*Primary Examiner*—Nasser Moazzami
*Assistant Examiner*—Shanto M Z Abedin

(57) ABSTRACT

Methods and apparatus to facilitate secured printing in a network environment. Imaging devices on the network are adapted to look for a security key associated with each print job or incoming data stream. If no security key is identified, an imaging device denies the print request, i.e., it accepts the print job and removes it from the print queue, but generates no tangible output. If a security key is identified, a request is sent to another device on the network containing a database of valid security keys in order to validate the identified key. If the other device validates the key, the imaging device generates the tangible output. Otherwise, it denies the print request.

25 Claims, 2 Drawing Sheets

SECURED PRINTING

TECHNICAL FIELD OF THE INVENTION

The present invention relates generally to methods and apparatus for secured printing.

BACKGROUND OF THE INVENTION

Computer networks have greatly enhanced the ability of people and organizations to work together through increased communications. However, this advance in communications also brings with it a greater risk of unauthorized loss of valuable information. A variety of security measures have been adopted, such as isolated or secure networks, user passwords, hardware keys, etc.

Despite security measures, an unauthorized user may gain access to a network device. This unauthorized user may seek to create a hard copy or tangible image of a file or other image on, or accessible through, the breached network device. To protect against loss of information, only authorized users should be able to generate this output. As such, it is desirable to prohibit the generation of tangible output by unauthorized users.

Tangible output in a network is generated by devices broadly known as imaging devices. Imaging devices include printers, plotters, multi-function devices and other devices used for applying an image to a tangible print media, such as paper, transparencies, card stock and more. The image is applied to the print media using a marking material, e.g., ink, ribbon, toner, or other means of applying an image to the print media.

When a tangible output image is desired, image data is converted into a form usable by the destination imaging device, often called a page description. A variety of high-level page description languages (PDLs) provide information to the imaging device on how to recreate the image. These PDLs are often device-independent languages, i.e., the same image data can be provided to devices of differing types and/or differing manufacturers to produce an end result that is substantially the same. Examples of PDLs include Printer Command Language or PCL-XL (Hewlett-Packard Company, Palo Alto, Calif., USA), PostScript® (Adobe Systems Incorporated, San Jose, Calif., USA) and Interpress (Xerox Corporation, Stamford, Conn., USA). In addition to containing data representative of the desired output image, PDLs also generally contain other information related to the control of the imaging device, e.g., what media tray to pull print media from, what resolution to use, whether the output should be in color or black and white, etc.

To process these PDLs, imaging devices have what is often referred to as a formatter. The formatter has a processor that is responsive to a control program to convert the image data to a printable image and to process the related control information. The control program typically provides interpretation of the PDLs, character generation, device emulation, interpretation of control tags and values, etc. The printable image is typically uncompressed raster or bitmap information that is supplied to another component of the imaging device, often referred to as a print engine. The print engine controls the mechanical components of the imaging device to produce the tangible output.

For the reasons stated above, and for other reasons stated below that will become apparent to those skilled in the art upon reading and understanding the present specification, there is a need in the art for alternative methods and apparatus for secured printing in a computer network.

SUMMARY

The various embodiments provide methods and apparatus to facilitate secured printing in a network environment. Imaging devices on the network are adapted to look for a security key associated with each print job or incoming data stream. If no security key is identified, an imaging device denies the print request, i.e., it accepts the print job and removes it from the print queue, but generates no tangible output. If a security key is identified, a request is sent to another device on the network containing a database of valid security keys in order to validate the identified key. If the other device validates the key, the imaging device generates the tangible output. Otherwise, it denies the print request.

Further embodiments of the invention include apparatus and methods of varying scope.

DETAILED DESCRIPTION

In the following detailed description of the present embodiments, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that process, electrical or mechanical changes may be made without departing from the scope of the present invention. The following detailed description is, therefore, not to be taken in a limiting sense, and the scope of the present invention is defined only by the appended claims and equivalents thereof.

The various embodiments provide methods and apparatus to facilitate secured printing in a network environment. Imaging devices on the network are adapted to look for a security key associated with each print job or incoming data stream. If no security key is identified, an imaging device denies the print request, i.e., it accepts the print job and removes it from the print queue, but generates no tangible output. If a security key is identified, a request is sent to another device on the network containing a database of valid security keys in order to validate the identified key. If the other device validates the key, the imaging device generates the tangible output. Otherwise, it denies the print request.

Others have proposed the use of security keys associated with print jobs and matched against a database of valid security keys maintained at each imaging device. If the incoming security key matches a security key contained on the imaging device, the print request is granted. The embodiments of the present invention provide for certain advantages over the maintenance of security keys on each imaging device. For example, by maintaining a database of valid security keys on a remote device, one security key host device can service every imaging device on the network. In addition, a single host simplifies maintenance as only one device needs to be updated if a revocation or addition of a security key is necessary. Furthermore, elimination of the database of keys within the imaging device frees up memory capacity to provide additional features on the imaging device or allows the reduction of memory installed on the imaging device in providing the same features.

Figure 1:
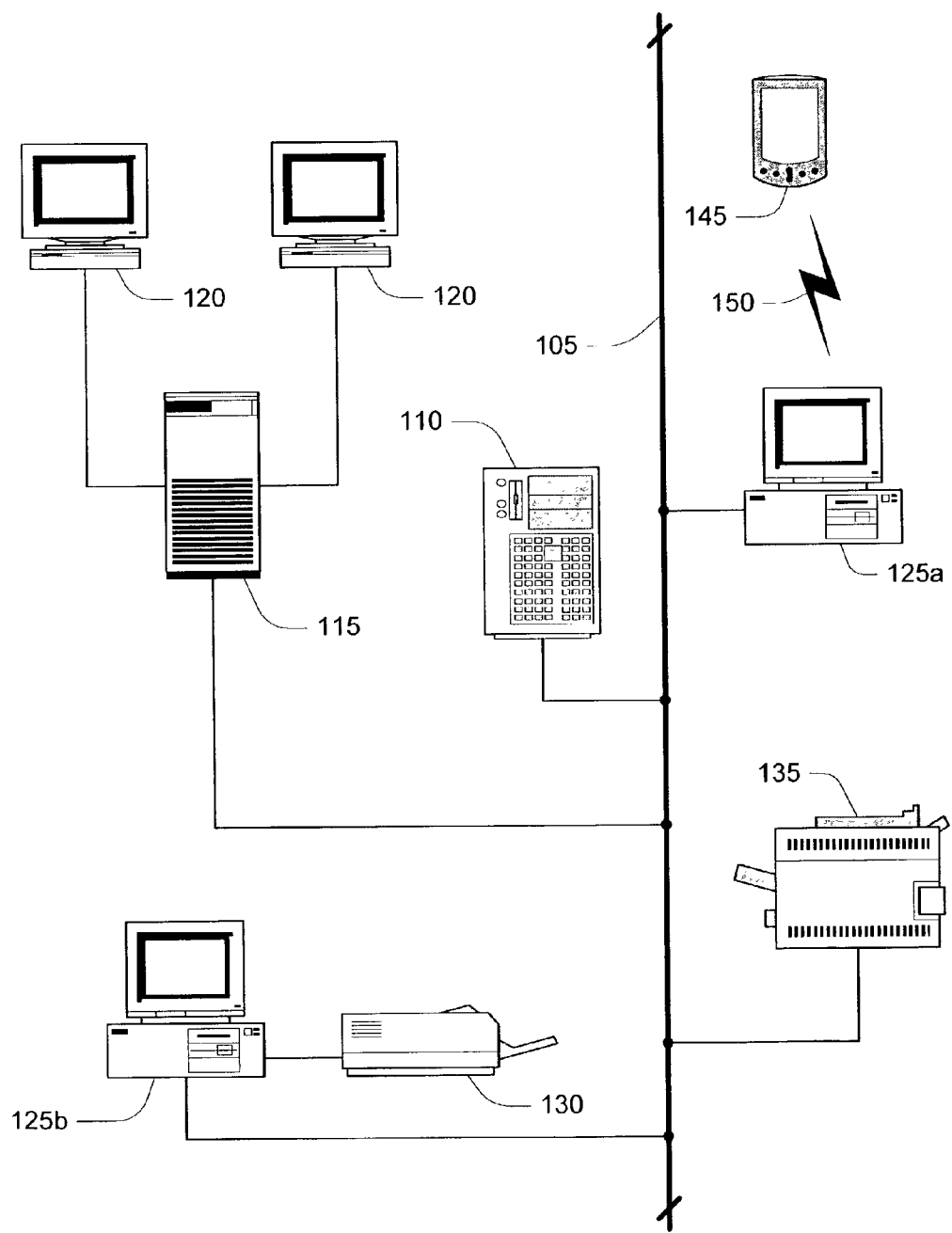
FIG. 1 is a computer network in accordance with an embodiment of the invention.

FIG. 1 is a computer network 105 in accordance with an embodiment of the invention. The network 105 may be coupled directly to a variety of network devices, such as servers 110/115, computer workstations 125 and network imaging devices 135. Other network devices may be coupled to the network 105, albeit indirectly. Examples include terminals 120 coupled to the network 105 through the server 115, imaging device 130 coupled to the network 105 through computer workstation 125b and handheld device 145 coupled to the network 105 through computer workstation 125a. The connection between a network device and the network 105 may be by a hardwired connection, a wireless connection, a combination or hardwired and wireless connections, or some other communication link. As an example, handheld device 145 is coupled to the computer workstation 125a through a wireless communication link 150. The imaging devices 130 and 135 are adapted to deny print requests in the absence of a valid security key in accordance with embodiments of the invention.

In general, to generate a tangible output, a print request is generated at some source device, such as terminals 120, computer workstations 125 or handheld device 145. The operating system supporting the source device uses a device driver to create an image page description that is in a form usable by a destination imaging device. The use of device drivers as a translation mechanism between the image source device and the destination imaging device is well known and will not be detailed herein. For use with embodiments of the invention, the device driver must be adapted to associate a security key with the image page description. Although outside the intent of this disclosure, modifying device drivers to associate a security key with the image page description is within the abilities of persons of ordinary skill in the art of creating device drivers. The security keys should be encrypted to prevent network sniffers from seeing the actual key sequences. In addition, the security keys should be unique to either the image source device or a user logged onto the image source device. As one example, each image source device or user has a unique device driver to generate image page descriptions associated with their respective security keys. As another example, each image source device or user uses the same device driver, but the device driver obtains the security key from the image source device, which may be unique to a user of the image source device.

Figure 2:
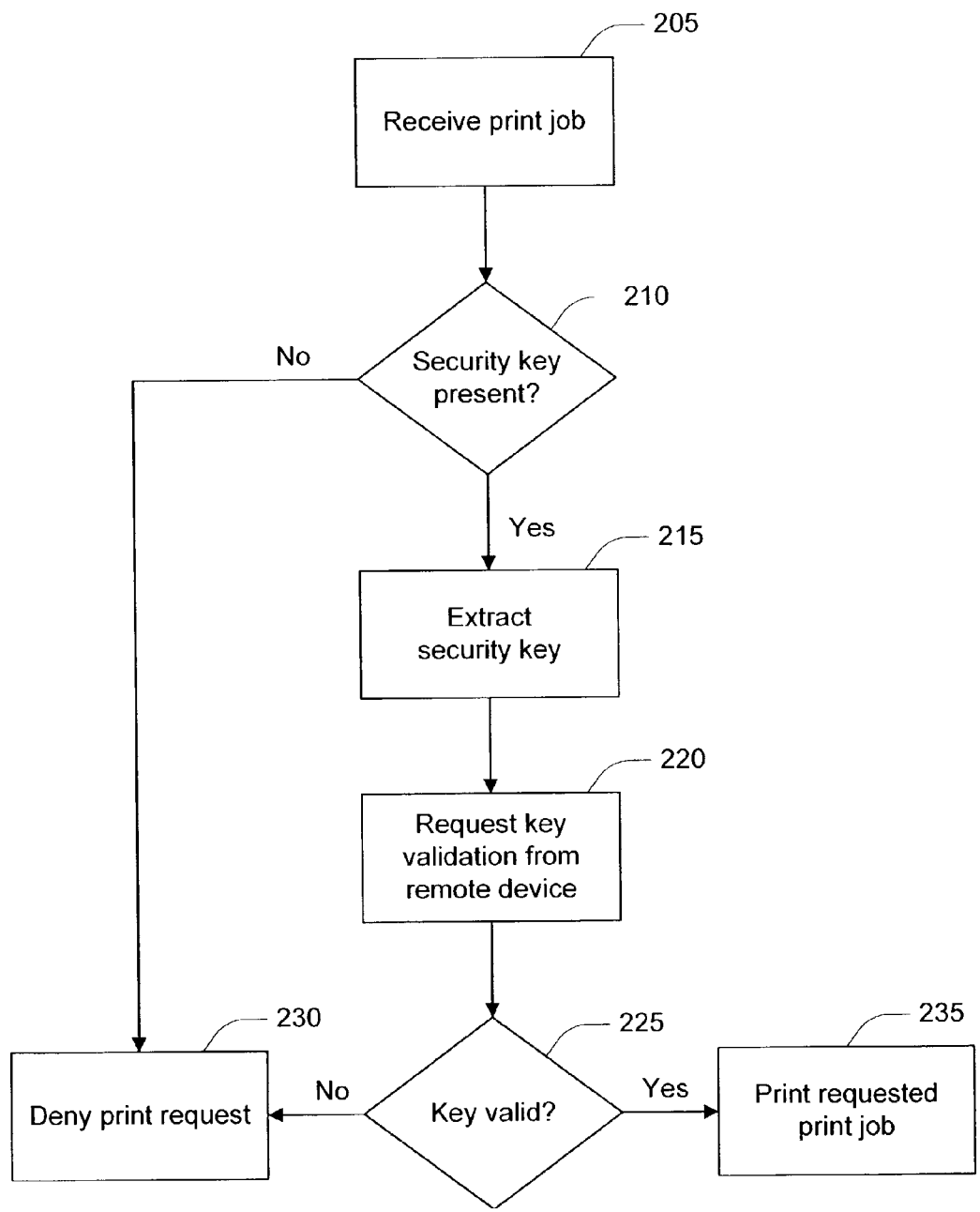
FIG. 2 is a flowchart of one method of operating an imaging device in accordance with an embodiment of the invention.

FIG. 2 is a flowchart of one method of operating an imaging device in accordance with an embodiment of the invention. A print job containing an image page description or other data stream containing image data and control information is received at the imaging device at 205. The image page description contains a security key identifying the source image device or a user of the computer network containing the imaging device as described above. As an example, an image page description generated using PCL-XL, a page description language developed by Hewlett-Packard Company, Palo Alto, Calif., USA, can contain vendor unique tags with accompanying values. A device driver for the imaging device would be adapted to generate the image page description containing a tag identifying that what information follows is a security key. This accompanying value would have a predefined format such that the receiving device could know what part of the information following the tag is representative of the security key.

At 210, the imaging device determines whether a security key is present in the print job. Continuing the example, the formatter of the imaging device would be adapted to look for and recognize the appropriate tag. If a security key is not found, control is transferred to 230 and the print request is denied. In general, denial of the print request results in no tangible output being generated, i.e., the data is received at the imaging device, but the image data is not processed. Although the image data may be stored on the imaging device as it is received, it should not be retained in a format usable for generation of a tangible output. For added security, each denial could be logged, along information representative of the source device or user, if available. Such logs could be maintained at the imaging device. Alternatively, such logs could be maintained at another network device in communication with the imaging device.

If a security key is found at 210, the key is extracted at 215. For example, upon detecting a tag known to identify a security key, the information following the tag is extracted from the image page description by the formatter. For one embodiment where the security key is encrypted, the formatter decrypts the key. For another embodiment where the security key is encrypted, the formatter extracts the key in its encrypted form.

At 220, the imaging device requests validation of the extracted security key information from a remote device. The remote device, or security key host device, can be any processor-based network device in communication with the imaging device. For one embodiment, the security key host device is a network server. The security key host device should be a well-known host on an encrypted channel.

The security key host device contains a database of valid keys. Query of the database should be by a secure protocol. If a match is made between the extracted security key information and the database of valid keys, the security key host device responds to the request with a validation. If no match is made, the security key host device responds with an indication that the key is invalid for the requesting imaging device. For one embodiment, the database of valid security keys is unique to each imaging device. For such an embodiment, the requesting imaging device would also supply information indicative of the identity of the requesting device. An example would include the IP address of the requesting imaging device. For embodiments where the request for validation sends encrypted security key information, the security key host device would decrypt the information prior to matching the key to the database.

If the key is valid at 225, the print request is honored and the formatter processes the image page description to generate the printable image for the print engine for generation of the tangible output. If the response from the security key host device indicates that the security key is invalid, or if no response is received from the security key host device, the print request is denied at 230.

As noted earlier, if a print request is denied at 230, the imaging device will not generate a tangible output representative of the desired image. The imaging device can simply consume the print job, i.e., it can accept the incoming data stream, but not process the image data. Alternatively, the imaging device can log the denied request. The logging information can be maintained on the destination imaging device. Alternatively, the logging information can be sent to another network device, such as the security key host device. For one embodiment, the logging information includes a copy of the denied print job and an indication of the source imaging device and/or the user making the request. Such information can be useful to an administrator of the network to track security breaches.

CONCLUSION

The various embodiments described herein provide methods and apparatus to facilitate secured printing in a network environment. Imaging devices on the network are adapted to look for a security key associated with each print job or incoming data stream. If no security key is identified, an imaging device denies the print request, i.e., it accepts the print job and removes it from the print queue, but generates no tangible output. If a security key is identified, a request is sent to another device on the network containing a database of valid security keys in order to validate the identified key. If the other device validates the key, the imaging device generates the tangible output. Otherwise, it denies the print request.

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any such adaptations or variations of the invention. It is manifestly intended that this invention be limited only by the following claims and equivalents thereof.

What is claimed is:

1. A method of generating tangible output from an imaging device, comprising:
   receiving a print job at the imaging device, wherein the print job comprises image data representative of a desired tangible output, determining at the imaging device if the print job includes a security key, and denying a print request for the print job if the print job does not include the security key;
   If the print request includes the security key:
   generating a request from the imaging device directed to a remote device for validation of the security key;
   generating the desired tangible output at the imaging device if the remote device validates the security key; and
   consuming the print job at the imaging device without generating the desired tangible output if the imaging device does not receive validation of the security key.

2. The method of claim 1, wherein the print job further comprises the security key in an encrypted form.

3. The method of claim 1, wherein generating a request further comprises sending the security key and information indicative of an identity of the imaging device to the remote device.

4. The method of claim 3, wherein at least the security key is sent to the remote device in an encrypted form.

5. The method of claim 1, wherein consuming the print job at the imaging device further comprises receiving the print job at the imaging device without retaining data representative of the desired tangible output in a format usable for generation of the desired tangible output.

6. The method of claim 1, further comprising:
   logging a source device from which the print job was received if no validation of the security key is received.

7. The method of claim 6, wherein logging a source device further comprises logging the source device at the remote device.

8. The method of claim 7, further comprising:
   associating a copy of the print job with the logged source device.

9. A method of operating an imaging device, comprising:
   receiving a print job from a first external device;
   looking for a security key contained in the print job;
   if a security key is not found in the print job, consuming the print job at the imaging device without printing; and
   if a security key is found in the print job:
   requesting validation of the security key from a second external device;
   printing the print job if the security key is validated by the second external device; and
   consuming the print job at the imaging device without printing if the security key is not validated by the second external device.

10. The method of claim 9, further comprising:
    extracting the security key from the print job prior to requesting validation.

11. The method of claim 10, further comprising:
    decrypting the security key, if necessary, prior to requesting validation.

12. The method of claim 9, wherein consuming the print job at the imaging device without printing further comprises not processing image data contained in the print job.

13. An imaging device, comprising:
    a print engine for generating tangible output from printable image data; and
    a formatter for generating the printable image data from a print job;
    wherein the imaging device is adapted to receive the print job from an image source device, to determine if the print job includes a security key, and to deny a print request for the print job following a determination that the print job does not include the security key;
    wherein the imaging device is adapted to extract the security key from the print job following a determination that the print job does include the security key;
    wherein the imaging device is adapted to request validation of the extracted security key from an external database of security keys; and
    wherein the imaging device is adapted to print the printable image data only if a security key is extracted from the print job and validation is received for the extracted security key.

14. The imaging device of claim 13, wherein the imaging device is further adapted to recognize a tag within the print job identifying a security key and to recognize that certain data following the tag is the security key.

15. The imaging device of claim 13, wherein the imaging device is further adapted to generate a log containing at least a source of a print job that is denied generation of tangible output.

16. The imaging device of claim 15, wherein the log is sent to an external device.

17. The imaging device of claim 16, wherein the external device contains the external database of security keys.

18. A method of operating an imaging device, comprising:
    receiving a print job from an image source device;
    analyzing the print job for an embedded security key;
    consuming the print job without printing if the print job does not include an embedded security key;
    extracting any embedded security key from the print job;
    sending the extracted security key and information identifying the imaging device to a remote host for validation against a database of security keys contained on the remote host;
    waiting for a response from the remote host; and
    generating tangible output representative of the data stream only if a security key is extracted and the response from the remote host indicates that the security key is valid.

19. The method of claim 18, further comprising:

comparing the extracted security key and information identifying the imaging device to a set security keys from the database of security keys that are valid for the imaging device;

generating a response indicative of a match if the extracted security key matches a security key in the database that is valid for the imaging device; and generating a response indicative of no match if the extracted security key does not match a security key in the database that is valid for the imaging device.

20. The method of claim 18, wherein the remote host is a network server in communication with the imaging device.

21. A printing system, comprising:

an image source device coupled to a network;

a security key host device coupled to the network; and an imaging device coupled to the network;

wherein the imaging device is configures to analyze a print job received by the imaging device from the image source device for the presence of a security key;

wherein the imaging device is configured to consume the print job without printing following a determination that the print job does not include a security key;

wherein the imaging device is configured to request validation from the security key host device of any security key found in the print job; and wherein the imaging device is configured to print the print job only if a security key is found in the print job and the security key host device validates that security key to the imaging device.

22. The printing system of claim 21, wherein the imaging device is configured to request validation by sending the security key and information identifying the imaging device to the security key host device.

23. The printing system of claim 21, wherein the imaging device is configured to log the print job if printing of the print job is denied.

24. The printing system of claim 21, wherein the imaging device is configured to send the print job and information identifying the image source device to the security key host device if printing of the print job is denied.

25. The printing system of claim 21, wherein the security key host device is a well-known host on an encrypted channel and wherein the imaging device is configured to request validation by sending the security key and information identifying the imaging device to the security key host device in an encrypted form across the encrypted channel.

* * * * *